United States Patent [19]

Dyer et al.

[11] 4,128,627

[45] Dec. 5, 1978

[54] SYNTHESIS OF HYDROGEN PEROXIDE

[75] Inventors: Paul N. Dyer, Horsham; Fred Moseley, Cobham, both of England

[73] Assignee: Air Products and Chemicals, Inc., Allentown, Pa.

[21] Appl. No.: 774,577

[22] Filed: Mar. 4, 1977

[30] Foreign Application Priority Data

Mar. 9, 1976 [GB] United Kingdom ............... 9351/76

[51] Int. Cl.$^2$ ............................................. C01B 15/02
[52] U.S. Cl. .................................................... 423/584
[58] Field of Search .......................................... 423/584

[56] References Cited

U.S. PATENT DOCUMENTS

| | | | |
|---|---|---|---|
| 3,336,112 | 8/1967 | Hooper | 423/584 |
| 3,361,533 | 1/1968 | Hooper | 423/584 |
| 4,007,256 | 2/1977 | Kim et al. | 423/584 |
| 4,009,252 | 2/1977 | Izumi et al. | 423/584 |

*Primary Examiner*—O. R. Vertiz
*Assistant Examiner*—Wayne A. Langel
*Attorney, Agent, or Firm*—Russell L. Brewer; Barry Moyerman

[57] ABSTRACT

Hydrogen peroxide is synthesized by reacting hydrogen and oxygen in a two phase mixture of water and an organic. The mixture contains a catalyst which is insoluble in water but dissolves in the organic. The hydrogen peroxide is extracted in the water.

The catalyst is $L_2MX_2$ where:

L is a ligand containing a Group 5b element (preferably phosphorous);

M is a Group 8 metal (preferably palladium); and

X is a halogen (preferably chlorine).

9 Claims, No Drawings

SYNTHESIS OF HYDROGEN PEROXIDE

This invention relates to a method of manufacturing hydrogen peroxide from its constituent elements, hydrogen and oxygen.

One current method of manufacturing hydrogen peroxide is by the successive reduction and oxidation of an anthraquinone. For example, a non-aqueous solution of 2-ethylanthraquinone is reduced with hydrogen gas over a palladium catalyst, filtered to remove the catalyst and subsequently oxidised with an oxygen containing gas to produce hydrogen peroxide and reform the anthraquinone. The product hydrogen peroxide is then extracted with water.

Among the disadvantages of this method are the necessity to circulate the anthraquinone solution through separate reaction vessels for reduction, oxidation and extraction, and the production of unwanted byproducts both from the anthraquinone and the solvent. This leads to high capital and raw material costs for the process.

It has been proposed in British Pat. Nos. 1,041,045 and 1,056,121-6 that hydrogen peroxide may be produced by contacting a mixture of hydrogen and oxygen with a solution of sulphuric and hydrochloric acids in a mixture of water and an oxygen containing organic solvent which is miscible with water e.g. acetone, in which is suspended a solid supported catalyst, e.g. palladium on silica gel. The main disadvantages of this method are the need to use an organic and acid solution to inhibit decomposition of the product hydrogen peroxide and the difficulty of separating hydrogen peroxide from the resulting mixture, which with certain relative amounts of hydrogen peroxide and organic is potentially explosive.

It has further been proposed in Belgian Pat. No. 830818 that hydrogen peroxide can be manufactured by contacting a mixture of hydrogen and oxygen with a supported or homogeneous platinum group metal catalyst suspended or dissolved in an aqueous sulphuric and hydrochloric acid solution. In order to minimise hydrogen peroxide decomposition the metal catalyst content per volume of aqueous solution must be kept low and a ratio of oxygen to hydrogen of around 2-10 (by volume) is required. The disadvantages of this process include again the fact that acid solutions are necessary, hydrogen peroxide is difficult to separate and the low catalyst concentration leads to large reactor volumes and high capital charges for a commercial process.

Among the catalysts referred to in the above-mentioned Belgian Patent is bis(triphenylphosphine) palladium chloride which is insoluble in water. It is known (Angew. Chem. Internat. Edit., Vol 6, page 93, 1967) that hydrolysis of a solution of bis(triphenylphosphine) peroxo nickel at $-78°$ C. produces hydrogen peroxide. It is also known (Chem. Lett. No. 8, page 809, 1975) that oxidative addition of organic acids to bis(triphenylphosphine) peroxo platinum will also produce hydrogen peroxide. However, none of these complexes is suitable as a catalyst for the synthesis of hydrogen peroxide since among other reasons triphenylphosphine is readily oxidised to triphenylphosphine oxide, and at room temperatures bis(triphenylphosphine) peroxo complexes of nickel, platinum and palladium decompose to the metal and phosphine oxide.

Viewed from one aspect, the present invention provides a method of manufacturing hydrogen peroxide which method comprises the steps of bringing hydrogen and oxygen into contact with a two phase liquid mixture comprising water and an organic solvent containing a catalyst which is insoluble or substantially insoluble in said water and soluble in said organic solvent.

The organic solvent is preferably totally immiscible in water.

The catalyst preferably comprises a complex of a Group 8 metal and is preferably of the type $L_2MX_2$, where L is a ligand containing a Group 5b element, M is a Group 8 metal and X a halogen. The dissolved catalyst should not materially decompose in the presence of water.

The group 5b element preferably comprises nitrogen, phosphorous or arsenic with phosphorous being most preferred.

$L_2$ can be two-separate monodentate ligands or one bidentate ligand.

The group 8 metal preferably comprises nickel, platinum or palladium with palladium being most preferred.

The ligand L is preferably of the type $AR_1R_2R_3$, where A is the group 5b element and $R_1$, $R_2$ and $R_3$ are alkyl, cycloalkyl or aryl groups, which may be substituted, or hydrogen or a halogen. Advantageously, the ligand comprises tri(pentafluorophenyl)phosphine, tricyclohexylphosphine and triphenylarsine; and the preferred catalysts are bis(tri(pentafluorophenyl)phosphine) palladium dichloride, bis(tricyclohexylphosphine) palladium dichloride and bis(triphenylarsine) palladium dichloride.

The organic solvent which should, of course, have little or no tendency to react with hydrogen peroxide under the conditions of the method is preferably one for which the distribution coefficient of hydrogen peroxide between water and itself is greater than one. Examples of suitable solvents are 1,2-dichlorobenzene, chlorobenzene and xylene.

A mechanical stirrer may be used to maintain the organic solution containing the catalyst and the water in intimate contact. However, it is preferred to achieve the contacting by vigorously bubbling the hydrogen and oxygen through the two phase liquid mixture. Substances which stabilise hydrogen peroxide solutions in water, e.g. sodium pyrophosphate, may optionally be added to the aqueous phase, but no other additives, in particular acids or alkalis, are necessary. This is particularly advantageous since the product hydrogen peroxide can simply be separated from the reaction mixture by allowing the two phases to separate and decanting the hydrogen peroxide in aqueous solution. In a continuous process the organic solution containing the complex can be recycled with make up water to the reaction stage.

The oxygen may be supplied pure or as part of a mixed gas, for example air. The hydrogen and oxygen may be introduced as a mixture which preferably does not support ignition under the conditions of the process, e.g. a mixture of up to 4% oxygen in hydrogen. Other non-ignitable mixtures are also included such as those obtained by diluting oxygen and hydrogen with a carrier gas, e.g. nitrogen and/or methane.

The process is advantageously operated at super atmospheric pressure e.g. 0 to 5000 psig and preferably at temperatures between the freezing point of the aqueous phase and 15° C. The more preferred temperature range is 0°-10° C.

EXAMPLE 1

In a borosilicate glass lined reactor, 400 ml of a 7.3 × $10^{-3}$M solution of $PdCl_2(P(C_6F_5)_3)_2$ in 1,2-dichlorobenzene were stirred with 400 ml of deionised water containing 500 ppm of sodium pyrophosphate at 800 rpm at 1.3° C. A mixture of 2.8% oxygen in hydrogen was bubbled into the reactor beneath the stirrer at 250 psi and 8 $Nlm^{-1}$. After one hour a sample was removed, allowed to separate into two phases, and the aqueous phase analysed for hydrogen peroxide by titration with ceric sulphate. A hydrogen peroxide concentration of 0.45 wt % was obtained in the aqueous phase. (Note: On separation a small amount of black emulsion was found between the two phases. This emulsion was found to be soluble in acetone.)

EXAMPLE 2

In a borosilicate glass lined reactor, 300 ml of a 1.5 × $10^{-3}$M solution of $PdCl_2P(C_6F_5)_3)_2$ in 1,2-dichlorobenzene were stirred with 300 ml of deionised water containing 400 ppm of sodium pyrophosphate at 600 rpm at 1.0° C. A mixture of 2.9% oxygen in hydrogen was passed into the reactor beneath the stirrer at 250 psi and 4 $Nlm^{-1}$. After one hour a sample was removed, allowed to separate into two phases, and the aqueous phase analysed for hydrogen peroxide by titration with ceric sulphate. A hydrogen peroxide concentration of 0.24 wt % was obtained in the aqueous phase, with a selectivity of 75% as determined by glc measurements of the outlet gas composition. (Note: On separation a small amount of black emulsion was found between the two phases. This emulsion was found to be soluble in acetone.)

EXAMPLE 3

A mixture of 2.4% $H_2$, 11.5% $O_2$ and 86.1% $N_2$ was bubbled at 920 psi and 3 $Nlm^{-1}$ through a borosilicate glass lined reactor containing 100 mls of a solution of 2.9 × $10^{-3}$M $PdCl_2(P(C_6H_{11})_3)_2$ in 1,2-dichlorobenzene plus 60 ml of deionised water containing 200 ppm of sodium pyrophosphate. The temperature was maintained at 5° C. After four hours a sample was removed, allowed to separate into two phases, and the aqueous phase analysed for hydrogen peroxide by titration with ceric sulphate. The aqueous phase was found to contain 0.10 wt % hydrogen peroxide. (Note: On separation a small amount of black emulsion was found between the phases. The emulsion was found to be soluble in acetone.)

EXAMPLE 4

A mixture of 2.5% oxygen in hydrogen was bubbled at 800 psi and 3 $Nlm^{-1}$ through a borosilicate glass lined reactor containing 100 mls of a solution of 2.5 × $10^{-3}$M $PdCl_2(As(C_6H_5)_3)_2$ in 1,2-dichlorobenzene plus 50 ml of deionised water containing 100 ppm of sodium pyrophosphate. The temperature was maintained at 12° C. After three hours a sample was removed, allowed to separate into two phases, and the aqueous phase analysed for hydrogen peroxide by titration with ceric sulphate. The aqueous phase was found to contain 0.03 wt % hydrogen peroxide. (Note: The black emulsion found in Examples 1, 2, and 3 was absent from this example.)

EXAMPLE 5

A mixture of 2.5% oxygen in hydrogen was bubbled at 1120 psi and 620 $Nlm^{-1}$ through a borosilicate glass lined reactor containing 149 mls of a solution of 5.4 × $10^{-3}$M $PdCl_2(P(C_6F_5)_3)_2$ in 1,2-dichlorobenzene plus 146 mls of deionised water. The temperature was maintained at 7° C. Aqueous phase samples were taken by stopping the gas flow 30 seconds before sampling to allow the phases to separate in the reactor, and deionised water was pumped into the reactor after sampling to maintain the aqueous volume. The samples were analysed for hydrogen peroxide by titration with ceric sulphate. After 4 hours, the aqueous phase was found to contain 1.73 weight percent hydrogen peroxide.

EXAMPLE 6

In a borosilicate glass lined reactor, 500 ml of a 5.1 × $10^{-3}$M solution of $PdCl_2(P(C_6F_5)_3)_2$ in 1,2-dichlorobenzene were stirred with 500 ml of deionised water at 800 rpm at 1.0° C. A mixture of 2.8% oxygen in hydrogen was passed into the reactor beneath the stirrer at 250 psi and 8 $Nlm^{-1}$. After 5 hours a sample was removed, allowed to separate into two phases, and the aqueous phase analysed for hydrogen peroxide by titration with ceric sulphate. A hydrogen peroxide concentration of 0.71 weight percent was obtained in the aqueous phase. (Note: on separation a small amount of black emulsion was found between the two phases. This emulsion was found to be soluble in acetone.)

EXAMPLE 7

In a borosilicate glass lined reactor, 500 ml of a 1.3 × $10^{-3}$M solution of $PdCl_2(P(C_6F_5)_3)_2$ in xylene were stirred with 500 ml of deionised water containing 400 ppm of sodium pyrophosphate at 800 rpm and 0.5° C. A mixture of 2.7% oxygen in hydrogen was passed into the reactor beneath the stirrer at 250 psi and 6$Nlm^{-1}$. After two hours a sample was removed, allowed to separate into two phases, and the aqueous phase analysed for hydrogen peroxide by titration with ceric sulphate. A hydrogen peroxide concentration of 0.24 weight percent was obtained in the aqueous phase.

What is claimed is:

1. In a process for producing hydrogen peroxide wherein a gaseous mixture comprising hydrogen and oxygen are contacted with a catalyst in the presence of water and an organic solvent, the improvement for reducing the risk of danger to explosion in said process which comprises:

employing an organic solvent which is immiscible with water and unreactive with hydrogen peroxide under the contacting conditions, and the distribution coefficient for hydrogen peroxide between water and said organic solvent is greater than one;

employing a catalyst of the formula $L_2MX_2$ wherein L is a ligand represented by the formula $AR_1R_2R_3$ wherein $R_1R_2$ and $R_3$ are alkyl, cycloalkyl or aryl groups, hydrogen and halogen, and A is a Group 5b element selected from the group consisting of nitrogen, phosphorus and arsenic, M is Group 8 metal and X is halogen, said catalyst being soluble in said organic solvent and insoluble in water; and employing a gaseous mixture which is nonignitable under the process conditions.

2. The method according to claim 1, wherein said ligand L is selected from the group consisting of tri(pentafluorophenyl) phosphine, tricyclohexylphosphine and triphenylarsine.

3. The method according to claim 1, wherein said catayst is selected from the group consisting of bis(tri(-pentafluorophenyl)phosphine) palladium dichloride, bis(tricyclohexylphosphine) palladium dichloride and bis(triphenylarsine) palladium dichloride.

4. The process of claim 1 wherein said gaseous mixture comprises oxygen, hydrogen, and a gas which is inert under the reaction conditions.

5. The process of claim 4 wherein said gas is nitrogen.

6. The method according to claim 1, wherein said Group 8 metal is palladium.

7. The method according to claim 1, wherein said halogen is chlorine.

8. The process of claim 1 wherein said gaseous mixture consists of oxygen and hydrogen and the ratio of oxygen to hydrogen does not exceed four parts oxygen per 100 parts hydrogen by volume.

9. The process of claim 1 wherein said organic solvent is selected from the group consisting of toluene, chlorobenzene and dichlorobenzene.

* * * * *